United States Patent
Cree et al.

(12) 
(10) Patent No.: US 6,803,417 B2
(45) Date of Patent: Oct. 12, 2004

(54) POLYOLEFIN POWDER, PROCESSES FOR MAKING AND USING SLUSH MOLDED ARTICLES MADE FROM THE SAME

(75) Inventors: Stephen H. Cree, Geneva (CH); Timothy E. Clayfield, Commugny (CH)

(73) Assignee: Dupont Dow Elastomers L.L.C., Wilmington, DE (US)

( * ) Notice: Subject to any disclaimer, the term of this patent is extended or adjusted under 35 U.S.C. 154(b) by 205 days.

(21) Appl. No.: 10/254,477

(22) Filed: Sep. 25, 2002

(65) Prior Publication Data

US 2003/0130420 A1 Jul. 10, 2003

Related U.S. Application Data

(60) Provisional application No. 60/329,012, filed on Oct. 11, 2001.

(51) Int. Cl.[7] .............................. C08J 9/30; C08L 23/00; C08L 23/04; C08L 27/10; C08L 43/00
(52) U.S. Cl. ...................... 525/191; 525/209; 525/240; 521/73; 521/75; 428/542.8
(58) Field of Search ................................ 525/191, 209, 525/240; 521/73, 75; 428/542.8

(56) References Cited

U.S. PATENT DOCUMENTS

| | | | |
|---|---|---|---|
| 4,618,654 A | * 10/1986 | Schmidtchen et al. | 525/288 |
| 4,664,864 A | 5/1987 | Wersosky | 264/301 |
| 4,798,864 A | * 1/1989 | Topcik | 525/71 |
| 5,266,627 A | 11/1993 | Meverden et al. | 524/527 |
| 5,308,699 A | 5/1994 | Hikasa et al. | 428/402 |
| 5,374,685 A | 12/1994 | Asanuma et al. | 525/288 |
| 5,741,858 A | * 4/1998 | Brann et al. | 525/101 |
| 5,929,129 A | 7/1999 | Feichtinger | 521/134 |
| 5,986,028 A | 11/1999 | Lai et al. | 526/126 |
| 6,204,330 B1 | 3/2001 | Braga et al. | 525/191 |
| 6,218,474 B1 | 4/2001 | Valligny et al. | 525/194 |

FOREIGN PATENT DOCUMENTS

EP 1050548 A1 11/2000

* cited by examiner

Primary Examiner—Nathan M. Nutter
(74) Attorney, Agent, or Firm—Whyte Hirschboeck Dudek SC

(57) ABSTRACT

Slush moldable polyolefin powders are prepared by blending a crosslinkable silane-grafted, olefinic interpolymer, optionally containing a crystalline polypropylene homopolymer or interpolymer; and a crosslinked silane-grafted, olefinic interpolymer containing a cure catalyst, the blend optionally containing a crystalline polyolefin powder. The resulting compositions can be slush molded to make a variety of articles of manufacture, especially automotive interior components, having good hot tear properties, low hardness and no glossing after heat aging.

19 Claims, No Drawings

POLYOLEFIN POWDER, PROCESSES FOR MAKING AND USING SLUSH MOLDED ARTICLES MADE FROM THE SAME

CROSS-REFERENCE TO RELATED APPLICATION

This application claims the benefit of U.S. Provisional Application No. 60/329,012 filed Oct. 11, 2001.

FIELD OF THE INVENTION

The present invention relates to a polyolefin composition in powder form comprising (i) a crosslinkable, vinyl silane-grafted blend of a olefinic interpolymer, optionally containing a crystalline polypropylene homopolymer or interpolymer; and (ii) a crosslinked vinyl silane-grafted olefinic interpolymer containing a cure or crosslinking catalyst; the above blend optionally containing a crystalline polyolefin powder. In another aspect, this invention relates to a process for preparing these polyolefin powders, and applications for using these powders. In a further aspect, this invention relates to laminates, both foamed and unfoamed, prepared from these polyolefin powders. In yet another aspect, this invention relates to processes to prepare these laminates.

BACKGROUND OF THE INVENTION

Automotive interior coatings are produced by a variety of techniques including vacuum molding and thermoforming of calendered or extruded sheets. If the mold has sharp corners or deep draw regions, then the molding process can lead to thinning of the material in these areas and significant loss of grain texture. Vacuum formed sheets, after cooling, can also contain a high residual molding stress caused during the molding process which, when reheated in subsequent back-foaming steps, can result in release of this stress. This, in turn, can cause shrinkage and dimensional stability problems. These stress areas can also lead to cracks forming over time as the skin ages.

An alternative process which is less susceptible to these problems is slush molding. In the slush molding technique, a free-flowing, powdered polymer is charged to an open top container or box, i.e., a slush box. A heated mold in the form of the article or object to be molded is clamped on top of the slush box, and the container rotated in a manner such that the free-flowing polymer powder contacts the hot mold where the powder melts and flows over the mold. The container is then returned to its original position, the mold removed from the container, and the article removed from the mold. This technique can realize complex shapes with sharp edges and excellent grain retention.

Introduction of passenger and door airbags has changed the requirement for automotive interior coverings from predominately appearance only criteria to that of a safety composition. Until recently, polyvinyl chloride (PVC) resins were the material of choice for interior coverings, and they are ideally suited for slush molding. However, PVC formulations suffer from migration and volatilization of the plasticizers over time, and this leads both to physical property changes in the PVC as it ages and to fogging of the car window glass. PVC also suffers from being heavier than alternative polyolefin materials (an important consideration in the current design of automobiles with the emphasis on lighter materials to reduce the overall weight of the vehicle and thus increase its gas efficiency). Additionally, the hardness, storage modulus, and brittleness of PVC increases as the ambient temperature decreases, and thus at low temperatures, e.g., about minus 40° C., the instrument panel skin upon airbag deployment could splinter.

An alternative to PVC is thermoplastic polyurethanes (TPU) which can be engineered to have the necessary flow characteristics required for slush molding. Such TPUs have good scratch and mar properties but the aromatic based TPUs have poor ultraviolet (UV) light resistance. Aliphatic isocyanates can be used to prepare TPUs having good UV-resistance but at a significant cost penalty.

Another problem with many existing compositions used in the slush molding process is poor hot tear resistance which can sometimes cause tearing of the molded product if it is removed from the mold while still hot. Having to wait for the molded article to cool increases production time and reduces efficiency.

Thus, there is a need by the automobile manufacturers and others to develop a polymer composition for automotive interior applications, especially polymer powder for slush molding operations, which has good hot tear properties, excellent low temperature properties, low hardness and no glossing after heat aging.

SUMMARY OF THE INVENTION

One embodiment of this invention is a polyolefin powder comprising about 80 to 95 wt % of component A, about 5 to 10 wt % of component B, and, optionally, 0 to 10 wt % of component C. Component A comprises a first powder of about 60 to about 99.9 wt % of a crosslinkable, silane-grafted, olefinic interpolymer, and, optionally, about 0.1 to about 40 wt % of a crosslinkable, silane-grafted, crystalline polypropylene homopolymer or interpolymer. Component B comprises a second powder of about 98 to 99.9 wt % of a crosslinked, silane-grafted, olefinic interpolymer, and from about 0.1 to 2 wt % of a cure catalyst. Component C comprises a crystalline polyolefin powder having a particle size of not greater than 500 microns. Optionally, the polyolefin powder blend of A, B, and C contains a blowing agent, typically a chemical blowing agent. Components A and B are prepared independently and blended together, optionally with Component C, to prepare the polyolefin powders of this invention. If Component C is absent from the polyolefin blend powder of the invention, then Component A comprises a polypropylene homopolymer or interpolymer.

In another embodiment of the invention, a process for preparing a polyolefin powder comprises the steps of:
(A) Contacting under grafting conditions (i) at least one olefinic interpolymer (ii) an unsaturated silane compound, and (iii) a free radical generating compound, to form a first silane-grafted, olefinic interpolymer;
(B) Melt blending from about 60 to about 99.9 wt % of the first silane-grafted, olefinic interpolymer with about 0.1 to about 40 wt % of at least one crosslinkable, silane-grafted, crystalline polypropylene homopolymer or interpolymer to form a first polymer blend;
(C) Forming the first polymer blend into a first powder;
(D) Mixing under grafting conditions (i) an olefinic interpolymer (ii) an unsaturated silane compound, and (iii) a free radical generating compound, to form a second silane-grafted, olefinic interpolymer,
(E) Curing the second silane-grafted olefinic interpolymer to a gel content of at least 10%;
(F) Forming the second silane-grafted, olefinic interpolymer into a second powder; and
(G) Mixing the first and second powders to form a polyolefin powder comprising about 90 to 95 wt % of the first powder and about 5 to 10 wt % of the second powder.

Certain of the steps of the process can be practiced in any order, e.g., steps D–F can precede or be performed simultaneously with steps A–C. In addition, step (G) can further comprise mixing the first and second powders with about 0.1 to about 10, preferably about 1 to about 8 and more preferably about 2 to about 7, wt % of a crystalline polyolefin powder having a particle size of not greater than about 500 microns.

In another embodiment of the invention, a process for preparing a polyolefin powder comprises the steps of:

(A) Melt blending from about 60 to about 99.9 wt % of at least one olefinic interpolymer with about 0.1 to about 40 wt % of at least one crystalline polypropylene homopolymer or interpolymer into a olefinic interpolymer blend;

(B) Contacting under grafting conditions (i) an olefinic interpolymer blend from step (A) (ii) an unsaturated silane compound, and (iii) a free radical generating compound, to form a first silane-grafted, olefinic interpolymer blend;

(C) Forming the first silane-grafted olefinic interpolymer blend into a first powder;

(D) Mixing under grafting conditions (i) at least one olefinic interpolymer (ii) an unsaturated silane compound, and (iii) a free radical generating compound, to form a second silane-grafted, olefinic interpolymer, (E) Curing the second silane-grafted olefinic interpolymer to a gel content of at least 10%;

(F) Forming the second silane-grafted, olefinic interpolymer into a second powder; and (G) Mixing the first and second powders to form a polyolefin powder comprising about 90 to 95 wt % of the first powder and about 5 to 10 wt % of the second powder.

Certain of the steps of the process can be practiced in any order, e.g., steps D–F can precede or be performed simultaneously with steps A–C. In addition, step (G) can further comprise mixing the first and second powders with about 0.1 to about 10, preferably about 1 to about 8 and more preferably about 2 to about 7, wt % of a crystalline polyolefin powder having a particle size of not greater than about 500 microns.

In yet another embodiment the invention is a process for preparing a polyolefin powder, the process comprising the steps of:

(A) Blending under grafting conditions (i) an olefinic interpolymer (ii) an unsaturated silane compound, and (iii) a free radical generating compound, to form a first silane-grafted, olefinic interpolymer;

(B) Forming the first silane-grafted, olefinic interpolymer into a first powder;

(C) Blending under grafting conditions (i) an olefinic interpolymer (ii) an unsaturated silane compound, and (iii) a free radical generating compound, to form a second silane-grafted, olefinic interpolymer, (D) Curing the second silane-grafted olefinic interpolymer to a gel content of at least 10%;

(E) Forming the second silane-grafted, olefinic interpolymer into a second powder; and (F) Forming a polyolefin powder from the first and second powders and a crystalline polyolefin powder having a particle size of not greater than about 500 microns, such that the blend composition comprises about 80 to 95 wt % of the first powder, about 5 to 10 wt % of the second powder, and about 0.1 to about 10, preferably about 1 to about 8 and more preferably about 2 to about 7, wt % of the crystalline polyolefin powder.

Here too, the order of the various steps can be changed, e.g., steps C–E can precede or be performed simultaneously with steps A–B. Moreover, step A can further comprise mixing about 60 to about 99.9 wt % of the first silane-grafted, olefinic interpolymer with about 0.1 to about 40 wt % of at least one crosslinkable, silane-grafted, crystalline polypropylene homopolymer or interpolymer to form a polymer blend from which the first powder is formed.

The compositions of this invention are especially useful in slush molding applications where polymers need to have good melt flow to allow for a uniform and fast distribution of the polymer in the mold. This is a surprising result since Component B of the invention exhibits little, preferably no flow at 190° C. when tested for melt index (MI) according to ASTM D-1238 condition E. Additionally surprising is the crosslinked polyolefin of Component B is still able to release the cure catalyst and achieve uniform cure of the slush molded article. Furthermore, slush molded articles prepared from compositions of this invention usually exhibit one or more of low hardness, excellent grain retention, no glossing after aging at 120° C., good scratch and mar resistance, excellent tensile and tear strength, a substantial absence of pinholes, and recyclability.

The use of a crosslinked catalyst carrier (Component B) has several advantages over existing methods of adding the cure catalyst. One advantage is the ability to prepare a complete slush molding formulation which has excellent stability against premature crosslinking. Typically, existing formulators add the neat cure catalyst as the last ingredient of a slush molding formulation just before molding to minimize premature crosslinking.

The polyolefin powders of this invention can also be used to perform "double slush" operations to prepare laminates. Specifically, after forming the first polymer layer or skin by slush molding, a second powder formulation containing a chemical blowing agent is molded onto the backside of the first polymer skin layer while the first skin layer is still in the mold. Heating the mold containing the first skin and the sintered foam formulation of this invention leads to foaming of the second slush layer and the formation of an in situ foam laminate with excellent adhesion between the first skin and the foam layer. No priming of the skin is needed, and this technique brings skin manufacturers closer to the goal of automotive interior laminates and coatings made entirely of polyolefinic materials (which are easier to recycle than laminates and coatings made of different polymeric materials). The crosslinked foam resists deformation at elevated temperature and are very soft and result in laminates with excellent haptics.

In addition to slush molding, powder compositions of this invention are useful in other molding methods including flow dipping, electrostatic coating, flame spray coating, and rotational molding.

DESCRIPTION OF THE PREFERRED EMBODIMENTS

Olefinic interpolymers useful in preparing Component A of this invention include ethylene/α-olefin interpolymers having a density of less than 0.91 g/cm$^3$, the interpolymer preferably having a weight ratio of ethylene to α-olefin of about 90:10 to 30:70, more preferably about 85:15 to 40:60, the α-olefin preferably a $C_3$–$C_{20}$ linear, branched or cyclic α-olefin, the interpolymer preferably having a Shore A hardness of 95 or less. The term interpolymer refers to a polymer made from at least two monomers. It includes, for example, copolymers, terpolymers and tetrapolymers. Examples of $C_3$–$C_{20}$ α-olefins include propene, 1-butene, 4-methyl-1-pentene, 1-hexene, 1-octene, 1-decene, 1-dodecene, 1-tetradecene, 1-hexadecene, and 1-octadecene. The α-olefin can also contain a cyclic structure such as cyclohexane or cyclopentane, resulting in an α-olefin such as 3-cyclohexyl-1-propene (allyl cyclohexane) and vinyl cyclohexane. Although not α-olefins in the classical sense of the term, for purposes of this invention certain cyclic olefins, such as norbornene and related olefins, are α-olefins and can be used in place of some or all of the α-olefins described above. Similarly, styrene and its related olefins (for example, α-methylstyrene, etc.), vinyl acetates, acrylates, and methacrylates are α-olefins for purposes of this invention. Illustrative copolymers include ethylene/propylene, ethylene/butene, and ethylene/1-octene. Illustrative terpolymers include ethylene/propylene/1-octene, ethylene/propylene/butene, ethylene/butene/1-octene, and ethylene/butene/styrene.

More specific examples of olefinic interpolymers useful in this invention include ultra low density polyethylene (ULDPE) (e.g., Attane® ethylene/1-octene polyethylene made by The Dow Chemical Company), homogeneously branched, linear ethylene/α-olefin copolymers (e.g. Tafmer® by Mitsui Petrochemicals Company Limited and Exact® by Exxon Chemical Company), homogeneously branched, substantially linear ethylene/α-olefin polymers (e.g. Affinity® polymers available from The Dow Chemical Company and Engage® polymers available from DuPont Dow Elastomers L.L.C.), and high pressure, free radical polymerized ethylene copolymers such as ethylene/vinyl acetate (EVA) polymers (e.g., Elvax® polymers manufactured by E. I. Du Pont du Nemours & Co.), and ethylene/acrylate polymers (e.g., Elvaloy® polymers manufactured by E. I. Du Pont du Nemours & Co.). The more preferred olefinic polymers are the homogeneously branched linear and substantially linear ethylene copolymers with a density (measured in accordance with ASTM D-792) from about 0.85 to less than 0.91 g/cm$^3$, especially from about 0.85 to about 0.90 g/cm$^3$, and a melt index (measured in accordance with ASTM D-1238 (190C/2.16) of about 10–500, preferably 15–150 g/10 minutes. The substantially linear ethylene copolymers are especially preferred, and are more fully described in U.S. Pat. No. 5,986,028 which is incorporated herein by reference. Blends of any of the above olefinic interpolymers can also be used in this invention.

Suitable crystalline polypropylene homopolymers or interpolymers optionally used in the preparation of Component A include polypropylene homopolymers, polypropylene interpolymers including interpolymers of propylene with at least one $C_4$–$C_{20}$ α-olefin such as 1-butene, 1-hexene or 4-methyl-1-pentene, copolymers of propylene and ethylene, and blends of any of the above crystalline polypropylenes, the interpolymer preferably having a weight ratio of propylene to α-olefin of about 98:2 to 70:30, more preferably about 95:5 to 80:20. As here used and also as used in the description of Component C, "crystalline" means a crystallinity of greater than about 30 percent. The polypropylene homopolymers are generally in the isotactic form although other forms of polypropylene can be used (e.g., syndiotactic or atactic). Preferred crystalline polyolefins include polypropylene homopolymers and copolymers of polypropylene which are comprised of at least about 50% propylene by weight. The copolymer may be a random copolymer or a block copolymer or a blend of a random copolymer and a block copolymer. The polypropylene homopolymer or copolymer has a melt flow ration (MFR) (230° C. and 2.16 kg weight) of at least 0.1 g/10 min, preferably greater than 5 g/10 min. Other suitable crystalline polypropylenes include branched polypropylene homopolymers and branched copolymers of polypropylene. Examples of preferred crystalline polypropylene polymers include Inspire® polymers (available from The Dow Chemical Company). For applications needing improved tear properties, preferably the crystalline polypropylene is blended with the olefinic interpolymer of this invention.

Suitable crystalline polyolefin powders useful as Component C include polyethylene homopolymers, linear low density polyethylene (LLDPE), medium density polyethylene (MDPE), high density polyethylene (HDPE), or interpolymers of ethylene with at least one α-olefin of from 3 to 20 carbon atoms such as 1-propylene, 1-butene, 1-isobutylene, 4-methyl-1-pentene, 1-hexene, 1-heptene, and 1-octene. Preferably, when HDPE is an interpolymer, it is a copolymer of ethylene and 1-octene. However, most preferably the HDPE is an ethylene homopolymer. Preferably Component C is a crystalline polyolefin having greater than 50 wt % ethylene and having a melting point greater than 90° C., preferably above 100° C., more preferably above 110° C., and most preferably above 120° C. The density of suitable ethylene homopolymers or interpolymers (as measured in accordance with ASTM D-792) is generally at least about 0.90, preferably at least about 0.92 and more preferably at least about 0.93 g/cc. The maximum density is typically not greater than about 0.96 g/cc. Generally, the melt index (MI) of suitable ethylene homopolymers or interpolymers useful for Component C (as measured according to ASTM D-1238 condition E) is of about 10–500, preferably of about 10–250, and more preferably of about 10–100 g/10 min. Examples of suitable crystalline polyethylene polymers for Component C of this invention include Coathylene™ polymers (available from E. I. DuPont de Nemours and Company). Blends of any of the above polymers can also be used in the practice of this invention for the preparation of Component C.

Additionally, the particle size of Component C is important in obtaining reduced pinhole formation and tear properties in articles made from the polyolefin powders of this invention. If the particle size is too large, the components do not mix uniformly, and this produces poor physical properties relative to polyolefin powders that are substantially uniformly mixed. The preferred particle size for Component C is less than 500, more preferably less than 350 and most preferably less than 250, microns ($\mu$m).

The crystalline polyolefin used in Components A and C can also be a blend of crystalline polyolefins or a blend of at least one crystalline polyolefin with one or more other thermoplastics. Such blends can be prepared in situ (e.g., by having a mixture of catalysts in a single polymerization reactor or by using different catalysts in separate reactors connected in parallel or in series) or by physical blending of polymers such as by known melt or dry blending techniques. If a mixture, then the mixture contains at least about 70, preferably at least about 80 and more preferably at least about 90, weight percent of at least one crystalline polyolefin.

The vinyl silane grafted, or simply silane-grafted, olefinic interpolymers useful in preparing Components A and B of this invention are prepared by grafting a vinyl silane onto the olefinic interpolymer and the crystalline polypropylene homopolymer or interpolymer. Any silane, or a mixture of such silanes, that will effectively graft to the interpolymer can be used in the practice of this invention. Suitable silanes include those of the general formula:

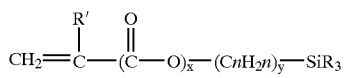

in which R' is a hydrogen atom or methyl group; x and y are 0 or 1 with the proviso that when x is 1, y is 1; n is an integer from 1 to 12 inclusive, preferably 1 to 4; and each R independently is a hydrolysable organic group such as an alkoxy group having from 1 to 12 carbon atoms-(e.g. methoxy, ethoxy, butoxy), aryloxy group (e.g. phenoxy), aralkoxy group (e.g. benzyloxy), aliphatic acyloxy group having from 1 to 12 carbon atoms (e.g. formyloxy, acetyloxy, propanoyloxy), amino or substituted amino groups (alkylamine, arylamino), or a lower alkyl group having 1 to 6 carbon atoms inclusive, with the proviso that not more than two of the three R groups is an alkyl (e.g., vinyl dimethyl methoxy silane). Silanes useful in curing silicones which have ketoximino hydrolysable groups, such as vinyl tris(methylethylketoamino) silane, are also suitable. Useful silanes include unsaturated silanes that comprise an ethylenically unsaturated hydrocarboxyl group, such as a vinyl, ally, isopropyl, butyl, cyclohexenyl or gamma-(meth) acryloxy allyl group, and a hydrolysable group, such as, for example, a hydrocarbyloxy, hydrocarbonyloxy, or hydrocarbylamino group. Examples of hydrolysable groups include methoxy, ethoxy, formyloxy, acetoxy, proprionyloxy, and alkyl or arylamino group. Preferred silanes are the unsaturated alkoxy silanes which can be grafted onto the polymer. These silanes and their method of preparation are more fully described in U.S. Pat. No. 5,266,627 to Meverden, et al. Vinyl trimethoxy silane, vinyl triethoxy silane, gamma-(meth)acryloxy propyl trimethoxy silane and mixtures of these silanes are the preferred silanes for use in establishing crosslinks.

The amount of silane used in the practice of this invention can vary widely depending upon the nature of the interpolymer, the silane, the processing conditions, the grafting efficiency, the ultimate application, and similar factors, but typically at least 0.2, preferably at least 0.5, more preferably at least 0.7 wt % silane, is used when grafting onto the olefinic interpolymer(s) used to prepare Component A. When grafting silane functionality onto the olefinic interpolymer(s) used to prepare Component B, the amount of silane needed is typically at least 0.15, preferably at least 0.2, more preferably at least 0.25 wt %. Considerations of convenience and economy are usually the two principal limitations on the maximum amount of silane used in the practice of this invention, and typically the maximum amount of silane does not exceed 3.5, preferably it does not exceed 2.5, more preferably it does not exceed 2.0 wt %. Weight percent silane is the amount of silane by weight contained in the mixture of the interpolymer(s) plus any other polymer(s) included with the elastomer during grafting such as a crystalline polyolefin. An amount of less than 0.1 wt % is undesirable because it does not result in sufficient crosslinking to permit the polymer from resisting deformation at elevated temperatures. An amount in excess of 3.5 wt % is undesirable because it does not contribute to the mechanical integrity of the cured polymer and increases the cost of the formulation. Overcured systems can be detrimental to elongation at break properties. An indication of level of crosslinking may be determined from gel content of the elastomer.

The silane is grafted to the resin (interpolymer plus any other polymer(s) included with the interpolymer during grafting), by any conventional method, typically in the presence of a free radical initiator e.g. peroxides and azo compounds, or by ionizing radiation, etc. Organic initiators are preferred, such as any one of the peroxide initiators, for example, dicumyl peroxide, di-tert-butyl peroxide, t-butyl perbenzoate, benzoyl peroxide, cumene hydroperoxide, t-butyl peroctoate, methyl ethyl ketone peroxide, 2,5-dimethyl-2,5-di(t-butyl peroxy)hexane, lauryl peroxide, and t-butyl peracetate. A suitable azo compound is azobis isobutyronitrile.

The amount of initiator can vary, but it is typically present in an amount of at least 0.04, preferably at least 0.06 wt %. Typically the initiator does not exceed 0.15, preferably it does not exceed about 0.10 wt %. The ratio of silane to initiator can also vary widely, but a typical silane:initiator ratio is about 10:1 to 30:1, preferably about 18:1 to 24:1.

While any conventional method can be used to graft the silane to the resin, one preferred method is blending the two with the initiator in the first stage of a reactor extruder, such as a single screw or a twin screw extruder, preferably one with a length/diameter (L/D) ratio of 20:1 or greater. The grafting conditions can vary, but the melt temperatures are typically between 160° C. and 280° C., preferably between 190° C. and 250° C., depending upon the residence time and the half life of the initiator.

The crosslinked vinyl silane grafted interpolymers used in component B of this invention are those described for component A except they must be crosslinked to a gel content (insoluble fraction) of at least 10% as determined by ASTM D 2765 using hot xylene as the solvent before blending with Component A. The interpolymer used in component B can be the same or different from the interpolymer used in component A and it can have the same or different levels of silane grafting as the interpolymers used in component A.

"Crosslinked", "substantially crosslinked" and similar terms mean that the polymer, in powder form or shaped into an article, has xylene extractables of less than or equal to 90 weight percent (i.e., greater than or equal to 10 weight percent gel content).

"Cured" means that the polymer, in powder form or shaped into an article, was subjected and exposed to a treatment which induced crosslinking.

"Crosslinkable" means that the polymer, in powder form or shaped into an article, is not cured or crosslinked and has not been subjected or exposed to treatment that has induced substantial crosslinking (although the polymer, in powder form or shaped into an article, comprises additive(s) or functionality which will effectuate substantial crosslinking upon subjection or exposure to such treatment (e.g., exposure to water).

Curing or crosslinking of the silane-grafted interpolymers of this invention is accelerated with a cure catalyst, and any catalyst that will provide this function can be used in this invention. These catalysts generally include organic bases, carboxylic acids and organometallic compounds including organic titanates and complexes or carboxylates of lead, cobalt, iron, nickel, zinc and tin. Illustrative catalysts include dibutyl tin dilaurate, dioctyl tin maleate, dibutyl tin diacetate, dibutyl tin dioctoate, stannous acetate, stannous octoate, lead naphthenate, zinc caprylate and cobalt naphthenate. Tin carboxylates such as dibutyl tin dilaurate, dimethyl hydroxy tin oleate, dioctyl tin maleate, di-n-butyl tin maleate and titanium compounds such as titanium 2-ethylhexoxide are particularly effective for this invention.

The amount of catalyst, or mixture of catalysts, present in Component B is a catalytic amount, typically between about 0.1 to about 2 wt %, preferably between about 0.15 and 1.5 wt %, more preferably between about 0.25 and 1 wt %. The catalyst(s) serves a dual purpose. First, the catalyst accelerates the curing of Component B to a gel content of at least about 10 wt %. Second and after the cured Component B is mixed with Component A, the catalyst (still present in Component B) accelerates the curing of Component A.

The polyolefin powders of this invention can be used to make polyolefin laminates using a "double slush" process. The double slush process and apparatus for practicing the process are generally described in U.S. Pat. No. 4,664,864 and in Bouwman et al.: "Double Slush", Kunstoffe plast europe, vol. 90 part 3 (2000). Briefly stated and as it specifically relates to manufacture of a skin-foam laminate for automotive interior applications using the polyolefin powders of this invention, the double slush process comprises first heating a shell forming mold to about 280° C. Next, into the open top of a slush box is added a polyolefin powder of the invention, and the heated mold is fixed to the top of the slush box. The slush box is then rotated through 360 degrees two and a half times and maintained in this position (upside down) for 10 seconds and then returned to the original position. Alternately, the box can be turned upside down to dump unfused powder out of the box for recovery. This forms the first skin layer that is typically about 0.1 to 1.0 mm in thickness on the shape-giving surface of the shell mold cavity.

The slush box is refilled with the composition of this invention containing 1 to 10 parts of a blowing agent such as azodicarbonamide. The slush box is then rotated through 360 degrees two and a half times and maintained in this position (upside down) for 10 seconds and then returned to the original position. The shell-forming mold is then heated to about 220° C. for about ten minutes to expand the composition containing the blowing agent to fuse it with the skin. This forms a 1 mm skin layer with a foam backing typically of about 3 mm.

A major advantage of the polyolefin powders of this invention when used in a double slush operation is that both a skin layer and a foam layer can be made that have excellent compatibility with and adhesion to each other. No priming of the skin is needed.

Because of the variability in metal composition and surface treatment of molds used in slush molding operations, the demolding of the powder slush molded product prepared by the powders of this invention may require the use of a demolding additive to reduce adhesion of the molded article to the mold surface. Accordingly, it is often desirable before molding to coat the mold surface with a mold release agent such as dimethylpolysiloxane. For a continuous production of many moldings, however, the mold release agent is preferably added after only a few moldings, which leads to increased costs. Adding about 1 wt % or less of a methylpolysiloxane compound as an internally added mold release agent to the polyolefin powder (A plus B and C if present) is effective. The addition may be made either before or after the powdering.

The polyolefin powders of the present invention may additionally incorporate additives such as, slip and/or softening agents, oil extenders, scorch and/or cure retarders, heat and/or weather resistant stabilizers such as phenol-, sulfite-, phenylalkane-, phosphite-, amine- or amide-type stabilizers; antioxidants; antistatic agents; metal soaps; inorganic fillers; lubricants such as waxes; and pigments for coloration can be formulated in such an amount not to damage the object of the present invention.

Illustrative examples of slip agents include fatty acid, fatty acid amide, fatty acid ester, glycerin and wax. Examples of inorganic fillers include, calcium carbonate, calcium silicate, carbon black, clay, kaolin, talc, silica, diatomaceous earth, mica powder, asbestos, alumina, barium sulfate, aluminum sulfate, calcium sulfate, basic magnesium carbonate, molybdenum disulfide, graphite, glass fiber, glass balloon, basic magnesium sulfate whisker, calcium titanate whisker and aluminum borate whisker. One example of a scorch retarder is bis triethoxy silyl ethane.

The molded articles according to the present invention are useful products in the following various fields: (i) in the automobile fields, for example, various automobile parts including interior cover materials of, for example, instrument panels, console boxes, arm rests, head rests, door trims, rear panels, pillar trims, sunvisors, trunk room trims, trunk lid trims, air bag covers, seat buckles, head liners, gloves boxes and steering wheel covers; interior molded articles of, for example, kicking plates and change lever boots; exterior parts of, for example, spoilers, side moles, number plate housings, mirror housings, air dam skirt and mud guards; and other molded articles of automobile parts; (ii) in the sport good fields, decorative parts of sport shoes, grips of rackets, sport tools and goods of various ball games, covering materials of saddles and handlebar grips of bicycles, motor-cycles and tricycles, etc.; (iii) in the housing and building fields, covering materials of furniture, desks, chairs, etc.; covering materials of gates, doors, fences, etc.; wall decorative materials; covering materials of curtain walls; indoor flooring materials of kitchens, wash rooms, toilets, etc; outdoor flooring materials such as verandas, terraces, balconies, carports, etc.; carpets such as front door or entrance mats, table cloths, coasters, ash tray doilys; (iv) in the industrial part field, grips and hoses for electric tools, etc., and the covering materials thereof; packing materials; and (v) in other fields, covering materials of bags, briefcases, cases, files, pocket books, albums, stationary, camera bodies, dolls and the other toys, and molded articles such as watch bands, outer frames of picture or photograph and their covering materials.

TEST METHODS

Percent gel is determined according to ASTM D2765-95. Melt Index ($I_2$) is determined at 190° C. according to ASTM 1238/E and for $I_{10}$ an ISO 1133/F standard is used. Tensile Strength and Elongation at break are determined using ISO 37 T2, Dumbell type 2 at a Test speed of 500 mm/min. Tear Strength is determined according to ISO 34C, Die C nicked sample. Particle size is determined by ASTM D 1921-96 Method B. Sixty degree gloss is determined by DIN 67530.

Molecular weight (MW) is determined by gel permeation chromatography (GPC) using a Waters 150C instrument. The pump was run at 55° C. with the columns and detector run at 140° C. The columns are #X mixed bed 10 um pl-gel. Injection volume is 200 $\mu l$ of a 0.14 wt % trichlorobenzene solution.

Pinholes are determined by visual inspection with the unaided eye of a 5 cm by 5 cm area of the material.

EXAMPLES

Example 1

Component A Preparation

To 984 g of an ethylene-octene (EO) copolymer (Engage 8401 available from DuPont Dow Elastomers L.L.C.) having a density of 0.885 g/cc, an ethylene content of 80 wt %, a MI of 30, a GPC molecular weight (Mw) of 49,000, and a MWD of 2.15 was blended with 1.5 wt % (15 g) of vinyl trimethoxy silane (VTMS) and 0.1 wt % (1 g) of Triganox 101 peroxide (available from Akzo Nobel) using a Buss compounding extruder. Extruder conditions are shown in Table 1 and 1A.

TABLE 1

| Buss Component | Temperature (C.) |
|---|---|
| Kneader screw | 170 |
| Barrel zone 1 | 150 |
| Barrel zone 2 | 260 |
| Head screw | 160 |
| Barrel of head screw | 160 |
| Die setting | 140 |

TABLE 1A

| Head screw speed rpm | 60 |
|---|---|
| Output rate kg/hr | 8 |
| Diameter of die holes mm | 2 |
| Speed of knife rpm | 9 |

The extruded silane grafted EO copolymer is pelletized under water using a die face cutter and the resulting pellets dried in a hopper dryer). The cooled granular pellets are then fed with a vibratory feeder from a feeding hopper to a pulverizer where the pellets are pulverized between 2 serrated discs (using a PKM 600 serrated disc grinding mill with temperature control available from Pallmann Maschinenfabrik, Germany) and then air conveyed to a screening machine. The coarse material is recycled to the pulverizer for further size reduction. Alternatively, the extruded silane grafted EO copolymer can be micropelletized using equipment supplied by Galla Industries, Eagle Rock, Va. USA. Using this technique the micropellets have a monodisperse particle size distribution with a diameter under 600 um. The dried powder or micropellets are bagged in foil-lined sacks to exclude moisture ingress prior to use.

Table 2 shows the size distribution of ground micropowder particles (in percent) of silane grafted copolymer. Table 2 also shows the particle size distribution of a commercial PVC slush molding compound (Comparative Example A). The commercial PVC compound is an emulsion PVC powder blended with 35 wt % plasticizer and stabilizers/pigments (available from ILPEA Industries Malgesso Italy)

TABLE 2

| Particle size (um) | Silane grafted Copolymer* | Comp. Ex. A* |
|---|---|---|
| <63 | 1 | 6 |
| 63 | 1 | 4 |
| 100 | 2 | 44 |
| 150 | 13 | 44 |
| 250 | 58 | 1 |
| 300 | 15 | 1 |
| 400 | 10 | 0 |

*weight percent

Component B Preparation

The EO copolymer (978 g) used to prepare Component A above is extruded with 0.7 wt % (7 g) of vinyl trimethoxy silane, 0.05 wt % (0.5 g) of Triganox 101 peroxide and 10 g of dibutyl tin dilaurate (based on the weight of the EO copolymer) using the same extruder conditions as for the preparation of Component A (Table 1). The extruded, silane-grafted EO copolymer is pelletized, treated in an oven at 60° C. for 24 hr to cure the copolymer, and then ground to a powder using a PKM 600 with temperature control (available from Pallmann Maschinenfabrik, Germany). The cooled granular pellets are fed with a vibratory feeder from a feeding hopper to a pulverizer where the pellets are pulverized between 2 serrated discs and then air conveyed to a screening machine. The course material is recycled to the pulverizer for further size reduction to obtain Component B as a micropowder with a mean particle size below 250 um. The MI of Component B is 0.

Component C

Component C is a HDPE powder having a density of 0.950 g/cc, a MI of 20, a melting point of 130° C., and a maximum particle size of 90 um (Coathylene* NB 5374 available from E. I. DuPont de Nemours and Company).

To 270 g of Component A was dry blended 15 g of Component B and 15 g of Component C using a Diosna KA 1272 high speed mixer to prepare Example 1.

Slush Molding of Example 1

A flat, embossed mold is heated to about 280° C. Into the open top of a slush box is added the polymer blend from Example 1 and the heated mold is fixed to the top of the slush box. The slush box is then rotated through 360 degrees two and a half times and maintained in this position (upside down) for 10 seconds and then returned to the original position. The mold is removed from the slush box and placed in an oven at 280° C. for 50 seconds. The mold is then removed from the oven and cooled with a water spray. The resulting skin is removed from the mold. The skin obtained has a weight of 65 g and a thickness of 1 mm, without pinholes and with excellent uniformity of the thickness. The skin is supported on a metal plate and aged in a recirculating air oven (UT 6060 EL manufactured by Heraeus) at 120° C. for 24 hr before being allowed to cool to room temperature. No areas of gloss were observed, and the skin is deemed an acceptable skin. When compared to the PVC skin, Example 1 has vastly superior Elongation at Break properties at both 23° C. and minus 40° C. (Table 5).

TABLE 3

| Elongation at Break (Tensile Test ISO 37T2) (%) | | |
|---|---|---|
| Test Temperature ° C. | Comp. Ex. A | Example 1 |
| 80 | 675 | 615 |
| 23 | 1317 | 775 |
| −40 | 8 | 368 |

A 1 mm thick skin sample of Example 1 is placed in a freezer set to the test temperature and maintained at the test temperature for 1 hour at which point the skin is removed and bent by hand. The data in Table 4 shows Example 1 is ductile and does not break, even at minus 90° C. whereas the PVC reference sample (Comp. Ex. A) breaks at minus 20° C. and becomes increasing brittle with decreasing temperature. At minus 90° C. the PVC sample shatters into many pieces.

TABLE 4

| Temperature (° C.) | Example 1 | Comp. Ex. A |
|---|---|---|
| −20 | Does not break | Breaks into 2 pieces |
| −30 | Does not break | Breaks into 4 pieces |
| −40 | Does not break | Breaks into 6 pieces |
| −90 | Does not break | Breaks into 12 pieces |

Example 2

Component A Preparation

To 1500 g of the EO copolymer from Ex. 1 is melt blended 500 g of a polypropylene (Inspire H716 from The Dow Chemical Company) having a density of 0.90 g/cc, and a MI (230° C. 2.16 kg) of 23 on a Buss compounder extruder and pelletized as in Example 1. To 984 g of this blend is tumble mixed 15 g of VTMS and 1 g of Triganox 101 peroxide using a Buss compounding extruder using extruder conditions in Table 1. The extruded silane grafted EO copolymer/polypropylene blend is cooled in a water bath and the cooled rod pelletized followed by grinding at room temperature to give Component A of Example 2.

To 285 g of Component A powder is blended 15 g of Component B from Example 1 on a Diosna high speed mixer for 10 minutes to provide polymer blend Example 2.

The polymer of Example 2 is slush molded using the same procedure as Example 1 except that following the slush box rotation two and a half times through 360 degrees, the mould in maintained in the upside down position for 30 seconds and the skin is heated in the oven at 280° C. for 2 minutes. The slush molded skin has no pinholes and a very uniform thickness. When compared to the PVC skin, the skin of Example 2 has superior tear properties at elevated temperature. The tear strength at 100° C. according to ISO 34 (die C) is 5.4 kN/m for Example 2 but only 1.4 kN/m for the commercial PVC sample.

Comparative Example B

To 1500 g of the EO copolymer from Example 1 was melt blended 500 g of polypropylene (Inspire H716) on a Buss compounder extruder, pelletized, and ground to a powder as in Example 1 to prepare Comparative Example B. No component B is present in this Comparative Example. Comparative Example B (300 g) is slush molded as in Example 2. The skin obtained has a weight of 65 g and a thickness of about 1 mm.

Comparative Example C

To 984 g of the EO copolymer from Example 1 was blended 15 g of VTMS, 1 g of Triganox 101 peroxide, and 0.5 g (500 ppm) dibutyl tin dilaurate on a Buss compounder extruder, pelletized, and ground to a powder as in Example 1 to prepare Comparative Example C. No component B is present in this Comparative Example. Comparative Example C (300 g) is slush molded as in Example 1. The skin, weighing about 65 g and having a thickness of about 1 mm, had numerous pinholes throughout the sample. Comparative Example C is stored for 24 hrs at room temperature and molded as in Example 1. In this case a skin cannot be formed due to the fact the powder does not fuse under slush molding conditions.

Comparative Example D

Component A

Component A is prepared as in Example 1.

Component B

To 49.5 g of the EO copolymer from Example 1 is blended 0.5 g of dibutyl tin dilaurate (10,000 ppm) using a Brabender internal mixer at 125° C. and 50 rpm. After mixing for 5 minutes under these conditions the mixture is removed from the mixer, allowed to cool and ground to a powder as in Example 1 to provide Component B. To 285 g of Component A is blended 15 g of Component B in a tumble blender for 10 minutes to provide Comparative Example D.

Comparative Example D (300 g) is slush molded as in Example 1. The skin, weighing about 65 g and having a thickness of about 1 mm, was aged in an oven at 120 C for 24 hr and allowed to cool to room temperature. The resulting skin had numerous glossy spots on the skin surface. Although an acceptable appearing skin was produced from the slush molding of Comparative Example D, thermal aging of the skin resulted in an unacceptable product due to glossy areas on the skin surface. The absence of the crosslinked silane grafted EO copolymer in Component B of Comparative Ex. D results in a skin that has glossy areas on the skin surface and contributed to a skin that had an unacceptable surface appearance

Comparative Example E

Component A

The silane grafted EO powder is the same as Component A in Example 1.

Component B

To 1 g of dibutyl tin dilaurate is added 99 g of a precipitated silica (Ultrasil VN2 available from Degussa-Huls) in a Diosna high speed mixer and the mixture blended at room temperature for 30 minutes. In this time the catalyst is absorbed onto the inorganic support (10,000 ppm catalyst) to provide Component B. To 285 g of Component A is blended 15 g of Component B in a tumble blender for 10 minutes to provide Comparative Example E.

Comparative Example E (300 g) is slush molded as in Example 1. The skin thickness varies from approximately 0 to 1 mm and has severe porosity (pinholes) and a rough surface. The sample could not be demolded without damaging the skin. Comparative Example E shows the importance of the catalyst carrier in the final properties of the skin. The use of an inorganic carrier produced a skin having inferior properties to those of a skin prepared with a crosslinked silane-grafted olefinic interpolymer of this invention (Tables 5 and 6).

As Table 5 shows, the tensile strength of Examples 1 and 2 are superior to the tensile strength of the Comparative Examples over a wide temperature range. Elongation at break of Example 1 is vastly superior to the elongation at break of the Comparative Examples at elevated temperatures.

TABLE 5

| Ex. And Comp. Ex. | Tensile Strength at 23° C. | Tensile Strength at 80° C. | Tensile Strength at 140° C. | Elongation at Break 23° C. | Elongation at Break 80° C. | Elongation at Break 140° C. |
|---|---|---|---|---|---|---|
| 1 | 11.6 | 0.8 | 0.2 | 775 | 615 | 502 |
| 2 | 9.6 | 2.2 | 1.1 | 224 | 142 | 125 |
| B | 4.8 | 0.2 | NM[1] | 82 | 63 | NM[1] |
| C | 6.4 | 0.5 | 0.1 | 452 | 128 | 75 |
| D | 7.8 | 0.3 | 0.1 | 536 | 230 | 140 |
| E | NM[2] | NM[2] | NM[2] | NM[2] | NM[2] | NM[2] |

Tensile Strength is in Mpa
Elongation at Break is in percent
NM[1] Samples had insufficient form retention to measure properties
NM[2] Sample did not form a suitable skin Table 6 shows the superior tear strength of Example 2, especially at elevated temperatures, compared to the Comparative Examples. Such improvement in tear properties reduces the potential for tearing or ripping a slush molded article when removing the hot article from the mold. Table 6 also shows the improved stability of the Examples of this invention at elevated temperatures. Such stability provides a margin of safety for the slush molder in the event that process upsets prevent a slush molded formulation from being processed immediately after preparation. If the slush formulation starts to crosslink before processing, resulting in a decrease in melt flow, the material cannot be processed using a slush molding process. Comparative Example C exhibited such a problem after storage for 24 hr.

TABLE 6

| Ex. and Comp. Ex. | Tear Strength at 23° C. | Tear Strength at 80° C. | Tear Strength at 140° C. | Day 1 Melt Flow $I_{10}$ at 190° C. | Day 3 Melt Flow $I_{10}$ at 190° C. |
|---|---|---|---|---|---|
| 1 | 33 | 2.9 | 0.5 | 117 | 116 |
| 2 | 84 | 6.8 | 3.5 | 344* | 320* |
| B | 54 | 2.9 | 0.7 | 403* | 398* |
| C | 34 | 1.2 | 0.6 | 104 | 0 |
| D | 32 | 2.1 | 0.6 | 126 | 115 |
| E | NM$^2$ | NM$^2$ | NM$^2$ | NM$^2$ | NM$^2$ |

*$I_{10}$ at 230 C.
Tear strength in kN/m.
NM$^2$ sample did not form suitable skin Table 7 summarizes the skin appearance of the Examples of this invention and the Comparative Examples. Ex. 1 has extremely low gloss and is pinhole free while exhibiting vastly superior elongation at break properties compared to the Comparative Examples. Ex. 2 also exhibits low gloss after oven aging while maintaining excellent tear strength compared to the Comparative Examples.

TABLE 7

| Ex. and Comp. Ex. | 60 Degree Gloss[1] | Number of Pinholes |
|---|---|---|
| 1 | 0.8/1.1 | 0 |
| 2 | 2.4/2.8 | <10 |
| A | 1.4/1.6 | 0 |
| B | 5/34 | <10 |
| C | NM | >50 |
| D | 2.3/5.1 | 0 |
| E | NM | >50 |

[1]Gloss before/after oven aging for 1 hr at 120° C.
NM—Surface of the samples were too rough to measure gloss The invention has been described in an illustrative manner, and the terminology which has been used is intended as words of description rather than as words of limitation. Obviously, many modifications and variations of the present invention in light of the above teachings may be made. Accordingly, the scope of the appended claims includes embodiments of the invention that are otherwise than as specifically described above.

What is claimed is:

1. A polyolefin powder comprising from about:
   (A) 90 to about 95 wt % of a first powder blend comprising (i) from about 60 to about 99.9 wt % of at least one crosslinkable, silane-grafted, olefinic interpolymer powder having a density less than about 0.91 g/cm$^3$, and (ii) from about 0.1 to about 40 wt % of at least one crosslinkable, silane-grafted, crystalline polypropylene homopolymer or interpolymer powder; and
   (B) 5 to about 10 wt % of a second powder blend comprising (i) from about 98 to about 99.9 wt % of a silane-grafted, crosslinked, olefinic interpolymer powder which has a gel content of at least about 10 percent, and (ii) from about 0.1 wt % to about 2 wt % of a cure catalyst.

2. The polyolefin powder of claim 1 further comprising from about 0.1 to about 10 wt % of a crystalline polyolefin powder having a particle size greater than about 500 microns.

3. A polyolefin powder comprising from about:
   (A) 80 to about 95 wt % of at least one crosslinkable, silane-grafted, olefinic interpolymer powder with a density less than about 0.91 g/cm$^3$;
   (B) 5 to about 10 wt % of a blend comprising (i) a silane-grafted, crosslinked, olefinic interpolymer powder which has a gel content of at least about 10%, and (ii) from about 0.1 to about 2 wt % of a cure catalyst; and
   (C) 0.1 to about 10 wt % of a crystalline polyolefin powder having a particle size greater than about 500 microns.

4. The polyolefin powder of claim 3 further comprising from about 0.1 to about 10 wt % of at least one crosslinkable, silane-grafted, crystalline polypropylene homopolymer or interpolymer.

5. The polyolefin powder of any of claims 1–4 further comprising a chemical blowing agent.

6. The polyolefin powder of claim 5 in which the olefinic interpolymer is a random interpolymer comprising ethylene and at least one of a $C_3$–$C_{20}$ linear, branched or cyclic α-olefin, and the weight ratio of ethylene to α-olefin is about 90:10 to 30:70.

7. The polyolefin powder of claim 6 in which the olefinic interpolymer is a linear or substantially linear ethylene/α-olefin interpolymer.

8. The polyolefin powder of claim 7 in which the α-olefin is at least one of 1-octene and 1-butene.

9. The polyolefin powder of claim 8 in which the crystalline polyolefin powder comprises a precipitated high density polyethylene.

10. A process for preparing a polyolefin powder, the process comprising the steps of:
   (A) Contacting under grafting conditions (i) at least one olefinic interpolymer, (ii) an unsaturated silane compound, and (iii) a free radical generating compound, to form a first silane-grafted, olefinic interpolymer;
   (B) Melt blending about 60 to about 99.9 wt % of the first silane-grafted, olefinic interpolymer with about greater than 0.1 to about 40 wt % of at least one crosslinkable, silane-grafted, crystalline polypropylene homopolymer or interpolymer to form a first polymer blend;
   (C) Forming the first polymer blend into a first powder;
   (D) Mixing under grafting conditions (i) at least one olefinic interpolymer, (ii) an unsaturated silane compound, and (iii) a free radical generating compound, to form a second silane-grafted, olefinic interpolymer,
   (E) Curing the second silane-grafted olefinic interpolymer to a gel content of at least 10%;
   (F) Forming the second silane-grafted, olefinic interpolymer into a second powder; and
   (G) Mixing the first and second powders to form a polyolefin powder comprising about 90 to about 95 wt % of the first powder and about 5 to about 10 wt % of the second powder.

11. The process of claim 10 in which step (G) further comprises mixing the first and second powders with about 0.1 to about 10 wt % of a crystalline polyolefin powder having a particle size of not greater than about 500 microns.

12. A process for preparing a polyolefin powder, the process comprising the steps of:
   (A) Blending under grafting conditions (i) at least one olefinic interpolymer, (ii) an unsaturated silane compound, and (iii) a free radical generating compound, to form a first silane-grafted, olefinic interpolymer;

(B) Forming the first silane-grafted, olefinic interpolymer into a first powder;

(C) Blending under grafting conditions (i) at least one olefinic interpolymer, (ii) an unsaturated silane compound, and (iii) a free radical generating compound, to form a second silane-grafted, olefinic interpolymer, (D) Curing the second silane-grafted olefinic interpolymer to a gel content of at least 10%;

(E) Forming the second silane-grafted, olefinic interpolymer into a second powder; and (F) Forming a polyolefin powder from the first and second powders and a crystalline polyolefin powder having a particle size of not greater than about 500 microns, such that the powder blend composition comprises about 80 to about 95 wt % of the first powder, about 5 to about 10 wt % of the second powder, and about 0.1 to about 10 wt % of the crystalline polyolefin powder.

13. The process of claim 12 in which step (A) further comprises melt mixing about 60 to about 99.9 wt % of the first silane-grafted, olefinic interpolymer with about 0.1 to about 40 wt % of at least one crosslinkable, silane-grafted, crystalline polypropylene homopolymer or interpolymer to form a polymer blend from which the first powder is formed.

14. A process for preparing a polyolefin powder, the process comprising the steps of:

(A) Melt blending from about 60 to about 99.9 wt % of at least one olefinic interpolymer with about 0.1 to about 40 wt % of at least one crystalline polypropylene homopolymer or interpolymer into a olefinic interpolymer blend;

(B) Contacting under grafting conditions (i) an olefinic interpolymer blend from step (A), (ii) an unsaturated silane compound, and (iii) a free radical generating compound, to form a first silane-grafted, olefinic interpolymer blend;

(C) Forming the first silane-grafted olefinic interpolymer blend into a first powder;

(D) Mixing under grafting conditions (i) at least one olefinic interpolymer, (ii) an unsaturated silane compound, and (iii) a free radical generating compound, to form a second silane-grafted, olefinic interpolymer, (E) Curing the second silane-grafted olefinic interpolymer to a gel content of at least 10%;

(F) Forming the second silane-grafted, olefinic interpolymer into a second powder; and (G) Mixing the first and second powders to form a polyolefin powder comprising about 90 to 95 wt % of the first powder and about 5 to 10 wt % of the second powder.

15. The processes of any of claims 10–13 comprising the further step of adding a chemical blowing agent to the polyolefin powder.

16. An article formed from the polyolefin powder of any of claims 1–4.

17. In the process of forming an article from a polyolefin powder by slush molding, the improvement comprising using as the polyolefin powder the polyolefin powder of any of claims 1–4.

18. The article of claim 17 in the form of a door panel.

19. The article of claim 17 in the form of an instrument panel skin.

* * * * *

UNITED STATES PATENT AND TRADEMARK OFFICE
CERTIFICATE OF CORRECTION

PATENT NO. : 6,803,417 B2
DATED : October 12, 2004
INVENTOR(S) : Stephen H. Cree et al.

It is certified that error appears in the above-identified patent and that said Letters Patent is hereby corrected as shown below:

Column 12,
Line 46, replace "1317" with -- 317 --.

Signed and Sealed this

Twenty-sixth Day of April, 2005

JON W. DUDAS
*Director of the United States Patent and Trademark Office*